Figure 1:
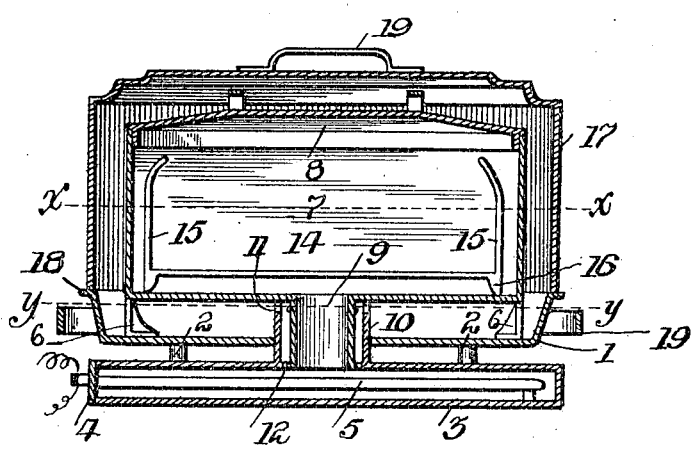

No. 837,094. PATENTED NOV. 27, 1906.
H. A. MILLER.
STERILIZER.
APPLICATION FILED AUG. 11, 1905.

Witnesses: Inventor
H. A. Miller,
By Attorneys

UNITED STATES PATENT OFFICE.

HAROLD A. MILLER, OF PITTSBURG, PENNSYLVANIA, ASSIGNOR OF ONE-HALF TO HUGH E. McGUIRE, OF PITTSBURG, PENNSYLVANIA.

STERILIZER.

No. 837,094.      Specification of Letters Patent.      Patented Nov. 27, 1906.

Application filed August 11, 1905. Serial No. 273,772.

*To all whom it may concern:*

Be it known that I, HAROLD A. MILLER, a citizen of the United States of America, residing at Pittsburg, in the county of Allegheny and State of Pennsylvania, have invented certain new and useful Improvements in Sterilizers, of which the following is a specification, reference being had therein to the accompanying drawings.

This invention relates to certain new and useful improvements in sterilizers; and the invention has for its object to provide a novel apparatus for sterilizing instruments, such as those used by doctors, surgeons, dentists, and all others requiring the perfect sterilization of instruments.

The invention aims to provide positive and reliable means for effecting a perfect sterilization of instruments used for purposes above mentioned. To this end I have devised a compact and portable apparatus adapted to be used for sterilizing and cleansing instruments of bacteria germs, and in connection with my improved apparatus I employ a suitable heating device, together with a tank of water, for generating steam and hot water adapted to insure a perfect sterilization of instruments placed within the apparatus.

In sterilizing apparatus heretofore used it has been impossible to quickly generate steam, owing to the fact that a great quantity of water has to be heated, which requires considerable time. It oftentimes is essential that the sterilization of instruments be accomplished as quickly as possible, especially when the instruments are to be used again during a surgical operation.

In the construction of my improved apparatus I have aimed to provide means for effecting a quick heating of water, whereby after the heating medium is placed in operation it will only be a short time until the steam is generated to sterilize instruments placed in the apparatus. By the construction of my improved apparatus I am enabled to provide a great heating-surface for a small quantity of water, and instead of heating the entire volume of water used in connection with the apparatus, as has heretofore been the practice, I simply heat a portion of the water and provide means whereby the steam generated from the water that is heated will pass directly into the sterilizing-chamber of the apparatus through a double tube with an air-chamber between the tubes to prevent the water causing recondensation of the steam.

With these and many other objects in view, which will more readily appear as the nature of the invention is better understood, the same consists in the novel construction, combination, and arrangement of parts to be hereinafter more fully described, illustrated, and claimed hereinafter.

The essential features of the present invention involved in carrying out the objects above specified are necessarily susceptible to structural change without departing from the scope of the invention; but the preferred embodiments are shown in the accompanying drawings, in which—

Figure 2:
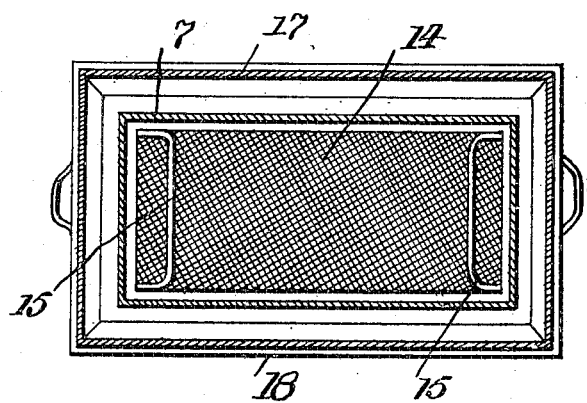
Figure 3:
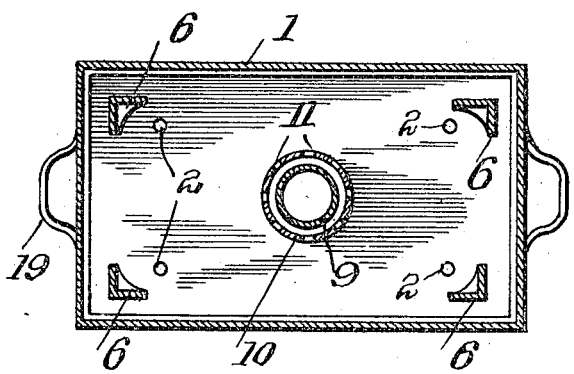

Figure 1 is a longitudinal vertical sectional view of my improved apparatus. Fig. 2 is a horizontal sectional view taken on the line $x$ $x$ of Fig. 1, and Fig. 3 is a similar view taken on the line $y$ $y$ of Fig. 1.

To put my invention into practice, I preferably construct my improved apparatus of non-corrosive material, such as copper; but it is obvious that other material may be readily used suitable for sterilizing apparatus.

The apparatus consists of a substantially rectangular basin-like reservoir 1, which is supported by a plurality of pipes 2 2 above the heating-casing 3, the pipes establishing communication between the reservoir 1 and the casing 3. The heating-casing 3 is substantially rectangular in form and is provided with a detachable head 4, that can be easily removed at any time desired, thus providing means for the cleansing of all the heating-cases and the removal of corrosion from these cases of the heating-chamber of the sterilizer. In the heating-casing 3 is placed a suitable heating device, which in this instance is a conventional form of electric heater. I preferably employ that type of heater which consists of coils of German silver wire 5 wound around asbestos cords and rove over porcelain buttons for insulation. This type of heater is generally supported by a suitable frame, and I preferably use this type, owing to the fact that it can be readily removed from the casing 3 at any desired time to renew the coils. However, I do not care to confine myself to this type of heating device, as the apparatus can be readily employed in connection with gas-burners or the like heating devices.

Supported within the reservoir 1 by suitable legs 6 is a substantially rectangular sterilizing-chamber 7, which is provided with a suitable form of lid or cover 8 to keep the steam under pressure, thereby increasing the temperature of the sterilizing-chamber. Centrally of the sterilizing-chamber 7 I provide a depending pipe 9, which communicates with the heating-casing 3, and through this pipe the steam generated by the heating medium is adapted to pass into the sterilizing-chamber. To protect the water contained within the reservoir 1 from the heating medium, I provide the casing 3 with an upwardly-extending sleeve 10, adapted to surround the pipe 9, and the upper edge of the sleeve is provided with a plurality of circumferentially-arranged apertures 11, while the top of the casing 3, which lies between the pipe 9 and the sleeve 10, is provided with openings 12. I have provided the openings 11, whereby should an overflow of water within the reservoir occur, this water can readily pass through the openings and descend into the heating-casing 3.

Within the sterilizing-chamber 7 I mount a wire-gauze frame 14, having suitable upwardly-extending handles 15 15. This frame is provided with depending legs 16, employed to support the frame 14 above the bottom of the sterilizing-chamber, and upon this frame the instruments or tools to be sterilized are placed.

The upper part of the apparatus is provided with a suitable housing or hood 17, which is adapted to rest upon the flared edges 18 of the reservoir 1. This hood rests upon the lid which covers the sterilizing-chamber, holding the steam down and increasing the pressure of the steam and providing for an escape of steam when the pressure is above that which is desired in the space between the heating and the outside of the sterilizing-chamber and recondensing the steam into water and conveying it into the reservoir. The hood 17, together with the lid or cover 8 and the reservoir 1, is provided with suitable handles 19 to facilitate removal of the lid and hood and facilitate transportation of the apparatus.

When the sterilizer is to be used, water is placed in the reservoir 1 until the heating-casing 3 has become filled and the water has reached the desired height within the reservoir 1. Upon the electric heater being placed in operation the water contained within the casing 3 will be immediately heated, and the steam generated by said water will pass upwardly through the pipe 9 into the sterilizing-chamber 7. As the water is generated into steam the casing 3 is fed from the reservoir 1 through the pipes 2 2, and the water contained within the reservoir will be protected from the heating medium by the pipe 9 and the sleeve 10. By this construction I am enabled to quickly sterilize instruments placed within the apparatus.

What I claim, and desire to secure by Letters Patent, is—

In an apparatus of the type described, the combination of a reservoir, a closed casing disposed beneath the reservoir and in communication with the reservoir, a spout extending from the top of the casing through the bottom of the reservoir, a chamber arranged above the reservoir, said spout extending through the bottom of said chamber, a lid mounted on said chamber and a hood mounted on the reservoir and inclosing said chamber.

In testimony whereof I affix my signature in the presence of two witnesses.

HAROLD A. MILLER.

Witnesses:
H. E. McGUIRE,
ELSIE DAVIS.